United States Patent [19]

MacArthur et al.

[11] Patent Number: 4,510,576

[45] Date of Patent: Apr. 9, 1985

[54] SPECIFIC COEFFICIENT OF PERFORMANCE MEASURING DEVICE

[75] Inventors: J. Ward MacArthur; James V. Radomski, both of Minneapolis, Minn.

[73] Assignee: Honeywell Inc., Minneapolis, Minn.

[21] Appl. No.: 401,993

[22] Filed: Jul. 26, 1982

[51] Int. Cl.³ .................. G01L 25/00; G01L 3/26
[52] U.S. Cl. .................. 364/551; 62/125; 62/129; 73/112; 364/557; 374/45
[58] Field of Search ........... 364/505, 506, 511, 551, 364/557; 73/112; 374/39, 45; 62/125, 126, 127, 130, 129

[56] References Cited

U.S. PATENT DOCUMENTS

| 3,082,951 | 3/1963 | Kayan . | |
|---|---|---|---|
| 3,555,251 | 1/1971 | Shavit | 364/505 |
| 3,707,851 | 1/1973 | McAshan, Jr. | 62/125 |
| 3,736,765 | 6/1973 | O'Dell | 62/125 X |
| 3,873,817 | 3/1975 | Liang | 364/506 |
| 3,946,573 | 3/1976 | Nichols et al. | 62/126 |
| 4,038,061 | 7/1977 | Anderson et al. | 62/126 |
| 4,114,448 | 9/1978 | Merritt | 62/129 X |
| 4,146,085 | 3/1979 | Wills | 62/127 |
| 4,186,563 | 2/1980 | Schulze, Sr. | 62/126 |
| 4,217,761 | 8/1980 | Cornaire et al. | 62/130 |
| 4,306,293 | 12/1981 | Marathe | 364/557 |
| 4,381,549 | 4/1983 | Stamp, Jr. et al. | 364/551 X |
| 4,410,950 | 10/1983 | Toyoda et al. | 364/551 |
| 4,432,232 | 2/1984 | Brantley et al. | 62/129 X |

FOREIGN PATENT DOCUMENTS 307276 8/1971 U.S.S.R. .................. 73/112

Primary Examiner—Gary Chin
Assistant Examiner—Kevin J. Teska
Attorney, Agent, or Firm—Alfred N. Feldman

[57] ABSTRACT

By measuring the power supplied to a compressor motor and by measuring four temperatures within a mechanical vapor-compression system, it is possible to develop a device for measuring and/or displaying the specific coefficient of performance of the mechanical vapor-compression system. The use of the temperatures and power supplied to the compressor motor can be used with information on motor losses and a typical temperature-enthalpy and a typical pressure-entropy diagram to allow substantially instantaneous computation of the actual specific coefficient of performance of a mechanical vapor-compression system as it operates. The measuring device can usually be installed totally external to a building in which the mechanical vapor-compression system is being used as a cooling system, or as a heat pump for heating and cooling.

9 Claims, 5 Drawing Figures

TYPICAL TEMPERATURE-ENTROPY (T-s)

TYPICAL PRESSURE-ENTHALPY (P-h)

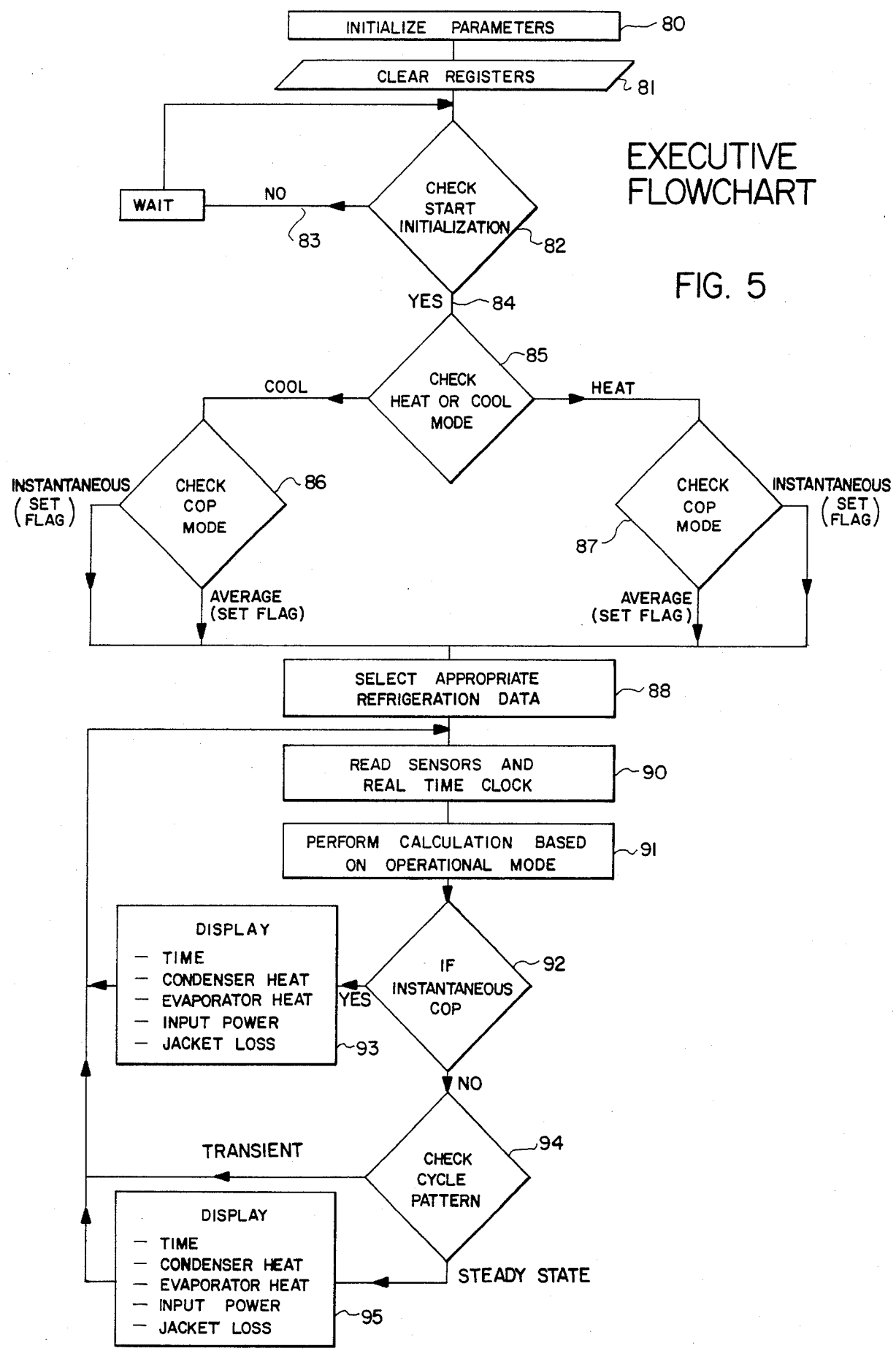

SPECIFIC COEFFICIENT OF PERFORMANCE MEASURING DEVICE

BACKGROUND OF THE INVENTION

To measure the coefficient of performance of a mechanical vapor-compression refrigeration system, two parameters must be known. These parameters are the input power, and the heat rejected (in the case of heating) or the heat absorbed (in the case of cooling). Currently, manufacturers test mechanical vapor-compression systems by measuring input power directly with a power transducer or indirectly with an ammeter, and by measuring the heat rejected or absorbed with a larger environmental chamber. This method allows accurate coefficient of performance measurement; however, it does not lend itself to application in the field, whether in the research laboratory or at a specific site, such as a home in which a heat pump or air conditioning system of the vapor-compression type is installed.

The need to measure the coefficient of performance of an air conditioning system or a heat pump has been recognized and is becoming more and more important with the widespread use of heat pumps as an energy efficient approach to heating and cooling. Attempts to provide measurements of the coefficient of performance have been undertaken by measurements of certain temperatures at a specific installation, but these measurements allow for only a relative coefficient of performance to be provided. The relative coefficient of performance provides a measure only of whether the efficiency of the particular vapor-compression system is increasing or is decreasing, but is incapable of delivering a specific coefficient of performance for the system.

SUMMARY OF THE INVENTION

The present invention discloses a coefficient of performance measuring device in the form of a meter that overcomes the limitations in prior art devices. The device is relatively inexpensive to build and is capable of on-site measurement, giving instantaneous measurements of the specific coefficient of performance, and does not interrupt the system operation. Unlike other devices suggested for this application, it is not merely diagnostic in nature, nor does it give only a relative coefficient of performance indication. Rather, it gives an absolute value of the specific operating condition of a heat pump or a vapor-compression system used typically in a residential or commercial cooling application.

The present invention is accomplished by measuring the power supplied to the compressor motor and, in its simplest form, measures four temperatures that are available normally outside of the building in which the vapor-compression system is installed. The four temperatures measured are the input temperature and the output temperature at the compressor, along with the temperatures into and out of the expansion valve or expansion means used in the vapor-compression system. With these four temperatures and the electrical power input to the compressor motor, it is possible to continuously compute and display the specific coefficient of performance by means of a meter that has within it a means for storing the losses of a particular type of motor being used to drive the compressor, the typical temperature-entropy curve, and the typical pressure-enthalpy curve of a vapor-compression system utilizing a particular refrigerant. The information as to the motor losses and the particular refrigerant can be set into the measuring device which contains a processor means. The various memory means, and the processor means (which contains a microprocessor or microcomputer) is capable of providing absolute values for the specific operating conditions of the mechanical vapor-compression system under test.

BRIEF DESCRIPTION OF THE DRAWINGS

FIG. 5 is a flow chart showing the basic operation of the device.

DESCRIPTION OF THE PREFERRED EMBODIMENT

Figures 1, 2, 3:
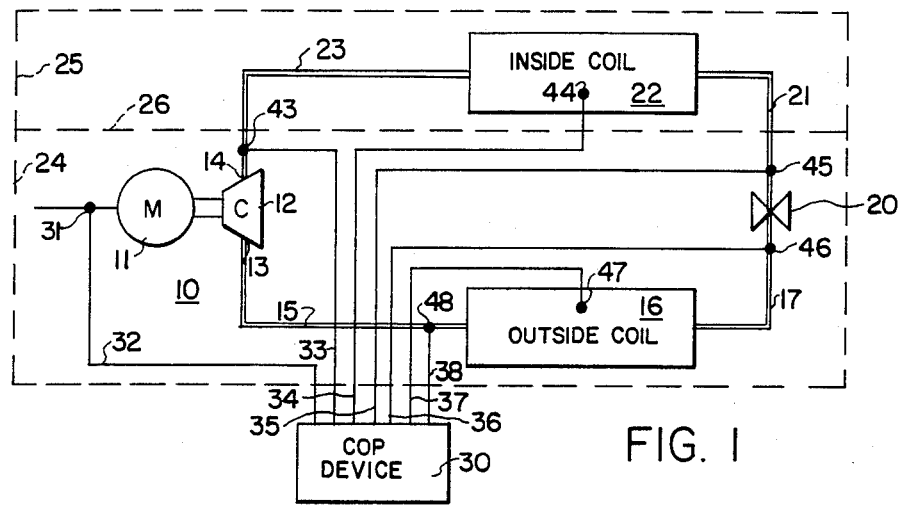
FIG. 1 is a block diagram of a mechanical vapor-compression system with the coefficient of performance meter attached.
FIG. 2 is a typical temperature-entropy curve for a mechanical vapor-compression system.
FIG. 3 is a typical pressure-enthalpy curve for a mechanical vapor-compression system.

A mechanical vapor-compression system is disclosed at 10. The mechanical vapor-compression system 10 can be considered as an air conditioning system for a building, or a heat pump for a building. The changeover mechanism for reversing of the system to create a heat pump has not been shown as it is not directly material to the present invention. The mechanical vapor-compression system 10 includes an electrically operated motor 11, a compressor 12 driven by motor 11, an outlet 13, and an inlet 14. The outlet 13 is connected by a pipe 15 to a coil 16 that has been identified as the outside coil for the present system. The outside coil is connected by a pipe 17 to a fluid expansion means 20 that has been indicated as an expansion valve. The fluid expansion means 20 is connected by a pipe 21 to a coil 22 that has been identified as the inside coil for the device. The refrigerant circuit for the system 10 is completed by a pipe 23 which connects the inside coil 22 to the inlet 14 of the compressor 12.

The coil 16 has been identified as the outside coil. Coil 16, the fluid expansion means 20, the compressor 12, its drive motor 11, and the outlet 13, and the inlet 14 of the compressor 12 are enclosed at 24 in a housing that typically would be external to a building when the system is used as an air conditioning system or as a heat pump. A second section has been enclosed by the portion indicated at 25 which encloses just the inside coil 22 and the piping 21 and 23 that connects the expansion means 20 and the inlet 14 of the refrigerant circuit to the compressor 12. Typically the portion shown at 25 would be enclosed within a furnace or air tempering system to provide heating or cooling to a building within which the portion 25 is enclosed. The portion 24 typically would be enclosed in a housing that is exterior to the building being temperature conditioned, and the entire portion encircled by the dotted portion 24 would be outside in a free air space. The portions 24 and 25 are separated at 26 to show which portions of the system typically would be inside of a building and which portions of the system would be typically outside of the building. It will be understood that the disclosure does not show the reversing mechanism in the event that the system was used as a heat pump. It is merely necessary that it be understood which portions are inside of the building and which are exterior to the building.

To complete the mechanical vapor-compression system, including the invention disclosed as a specific coefficient of performance measuring device, the device itself is disclosed at 30. The coefficient of performance measuring device 30 is connected by a plurality of electrical conductors to sensors that measure temperature within the system, and to a power transducer. A power transducer is indicated at 31 which is connected by a conductor 32 to the coefficient of performance measuring device 30. Also included are a series of six conductors 33, 34, 35, 36, 37, and 38 which are connected between the coefficient of performance measuring device 30 and a plurality of temperature sensing means connected to various parts of mechanical vapor-compression system 10. The conductor 33 is connected to a sensor means 43 that is a temperature sensor at the inlet 14 of the compressor 12. The conductor 34 is connected to a temperature sensing means 44 that is physically mounted on the inside coil 22 of the mechanical vapor-compression system. The conductor 35 is connected to an outlet side of the fluid expansion means 20 at 45 and is capable of measuring the temperature at that point. The conductor 36 is connected to a temperature sensor 46 that is connected at the inlet side of the fluid expansion means 20, to measure the temperature of the pipe 17 as fluid enters the expansion means 20. The conductor 37 is connected to a sensor 47 that is attached in a heat exchange relationship to the surface of the outside coil 16 to measure its temperature during the operation of the system. The system is completed by the conductor 38 being connected to a temperature sensor 48 that is effectively connected to the outlet 13 of the compressor 20 by being connected to the pipe 15 in a heat exchange relationship. The six temperature sensors can be any type of temperature sensor capable of being attached, clamped or mounted on the system under test. The sensors provide an electrical signal that can be measured.

As can be seen from the arrangement, the coefficient of performance device 30 is capable of being connected to the mechanical vapor-compression system 10 to measure parameters of that system without the need to break into the refrigeration piping to measure any specific flow or pressure as a parameter of the operation. The sensors 43 through 48 are merely temperature sensors which can be mounted in good heat exchange relationship to the surfaces of the mechanical vapor-compression system 10. The sensor 31 is a power transducer means that is capable of measuring the power being supplied electrically to the motor 11. This could be a clamp-on type of ammeter, or other power measuring device. Further, it is noted that only one connection is made within the enclosure 25 and that is to the inside coil 22 at the sensor 44. In certain cases the temperature of the inside coil 22 and the outside coil 16 are not needed, and it can thus be seen that all of the connections can be made within the housing portion 24 which is exterior of a building. This allows the coefficient of performance measuring device 30 to be connected to a system without the need to gain access to the building in which the system provides climate control. The operation of the coefficient of performance measuring device 30 will be brought out in connection with the balance of the figures of the present disclosure.

FIGS. 2 and 3 show the pertinent thermodynamic states for evaluating the coefficient of performance of a mechanical vapor-compression system on both a temperature-entropy (T-s) and a pressure-enthalpy (P-h) diagram. In FIG. 2 the typical temperature-entropy (T-s) diagram is provided in which the temperature in degrees Fahrenheit is compared against enthalpy in British thermal units per pound mass. The diagram shows six states (which have been identified as numbers which are circled) that are of interest in connection with the development of the theory of operation of the present device. The balance of FIG. 2 has been labeled with the various states of the liquid and vapor and are believed self-explanatory.

In FIG. 3 a typical pressure-enthalpy (P-h) diagram is disclosed wherein the six states are again disclosed as numbers within circles. In the typical pressure-enthalpy diagram the pressure in pounds per square inch absolute is measured against the entropy in British thermal units per pound mass. The diagrams of FIGS. 2 and 3 are typical and will vary from refrigerant to refrigerant. As such, a means for storing this information is provided within the coefficient of performance device 30 as will be brought out below. In the discussion below which develops the theory of operation of the system disclosed in FIG. 1, the diagrams of FIGS. 2 and 3 will be referred to.

The system coefficient of performance of the mechanical vapor-compression system is defined as the ratio of the heat rejected to the total work input for heating, and as the ratio of the heat absorbed to the total work input for cooling are respectively:

$$COP_{sh} = \frac{\dot{m}_r(h_2 - h_4)}{W_t} \tag{1}$$

where:
$COP_{sh}$ = the system coefficient of performance while heating
$W_t$ = the total work input including transport pumps and fans
$\dot{m}_r$ = the mass flow rate of the refrigerant $h_2$ and $h_4$ are enthalpies of the refrigerant at states 2 and 4.

$$COP_{sc} = \frac{\dot{m}_r(h_1 - h_5)}{W_t} \tag{2}$$

where:
$COP_{sc}$ = the system coefficient of performance while cooling
$h_5$ is the enthalpy at state 5

The COP of the refrigerant flow circuit is:

$$COP_{rh} = \frac{h_2 - h_4}{h_2 - h_1} \tag{3}$$

where:
$COP_{rh}$ = the refrigerant coefficient of performance while heating;
$h_1$ is the enthalpy at state 1 and $$COP_{rc} = COP_{rh} - 1 = \frac{h_1 - h_5}{h_2 - h_1} \tag{4}$$

where:
$COP_{rc}$ = the refrigerant coefficient of performance while cooling;
The compressor work ($W_c$) is:

$$W_c = nW_{in} \tag{5}$$

where:
$W_{in}$ = power to the motor that drives the compressor (directly measurable with a power transducer),
n = motor efficiency (a function of load).
The work input to the refrigerant ($W_r$) is:

$$W_r = \dot{m}_r(h_2 - h_1) \tag{6}$$

and, $$W_r = W_c - Q_{amb} \tag{7}$$

where:
$Q_{amb}$ = jacket heat loss of the compressor
Combining equations (5) and (7) gives the refrigerant flow rate through the compressor as:

$$\dot{m}_r = \frac{W_{in} n - Q_{amb}}{h_2 - h_1} \tag{8}$$

The total electrical power input to the system is given by:

$$W_t = W_{in} + W_{fans} + W_{pumps} + W_{defrost} + W_{controls} + W_{crank\ case} \tag{9}$$

Combining equations (1) and (8):

$$COP_{sh} = \frac{(W_{in} n - Q_{amb})(h_2 - h_4)}{W_t(h_2 - h_1)} \tag{10}$$

Similarly combining equations (2) and (8):

$$COP_{sc} = \frac{(W_{in} n - Q_{amb})(h_1 - h_5)}{W_t(h_2 - h_1)} \tag{11}$$

These equations show that once the power inputs, casing loss and compressor motor efficiency are determined, the system coefficient of performance can be calculated knowing states 1, 2, 4 and 5. The method of calculating the states is given below.

A microprocessor (shown in FIG. 4) will have the relevant properties of the common refrigerants stored in its memory. Thus, with a single selector switch (not shown), the user can address the appropriate tables for the refrigerant that is under study. In the ideal system (no viscous pressure losses; no subcooling and no superheat), we can use the temperatures at states 1, 2, 4 and 5 directly to generate the relevant enthalpies. For instance, state 4 is saturated, thus:

$$T_4 \rightarrow h_4 \text{ and } P_4 \tag{12}$$

and $$h_4 = h_5 \tag{13}$$

$$T_5 \rightarrow P_5 \tag{14}$$

$$P_5 \rightarrow P_1 \tag{15}$$

$$P_1 \text{ and } T_1 \rightarrow h_1 \tag{16}$$

$$P_4 = P_2 \tag{17}$$

$$P_2 \text{ and } T_2 \rightarrow h_2 \tag{18}$$

Therefore, by using suitably insulated temperature sensors located at the compressor inlet 14 and outlet 13, and across the fluid expansion means 20, the enthalpies at states 1, 2, 4 and 5 can be determined.

Consider the effect of viscous pressure loss in the evaporator. If a well insulated temperature sensor is installed half-way along the fluid circuit of the condensor, state 6, we can assume that half of the condenser pressure loss occurs between states 5 and 6.
Therefore, since:

$$T_6 \rightarrow P_6 \tag{19}$$

and $$P_1' = P_5 - 2(P_5 - P_6) \tag{20}$$

equation (20) can be rearranged as:

$$P_1' = 2P_6 - P_5 \tag{21}$$

Assuming no significant pressure drop in the superheat region:

$$P_1' = P_1 \tag{22}$$

now $$h_1 = f(P_1, T_1) \tag{23}$$

Similarly, it can be shown for viscous pressure loss in the evaporator:

$$P_2' = 2P_3 - P_4 \tag{24}$$

If one considers the viscous pressure loss of the refrigerant gas in the condenser to be negligible, we may write:

$$P_2' = P_2 \tag{25}$$

now $$h_2 = f(P_2, T_2) \tag{26}$$

Therefore, for mechanical vapor-compression systems presumed to have significant viscous pressure losses, the addition of suitably insulated sensors at states 3 and 6 and the substitution of equations (23) and (26) for equations (16) and (18) respectively, will yield correct results.

Consider the effect of subcooling. With the system in dynamic operation, sensor 4 will sense the temperature of a saturated liquid or a subcooled liquid. If state 4 were a saturated liquid, then:

$$h_4 = f(T_4) \tag{27}$$

Thus, knowing only the temperature of state 4, the microprocessor can determine the enthalpy according to an expression in the form of equation (19). If state 4 is a subcooled liquid, then theoretically:

$$h_4 = f(T_4, P_4) \tag{28}$$

However, in the subcooled region, pressure has little or no effect on the enthalpy, thus the enthalpy at state 4 can always be given by equation (27). There is some error introduced due to the assumption on the consistency of the pressure drop mechanism in going from two-phase flow to the superheat region at state 1. However, at this time it is felt that this error is extremely small and will have little or no effect on the accuracy of the device (for example the pressure drop through the evaporator of a well designed mechanical vapor-compression system will in itself be small).

The compressor jacket heat loss can be considered if desired. Essentially, the work input to the shaft during compression that does not go into changing the enthalpy of the refrigerant is dissipated as waste heat. When measuring the coefficient of performance of the mechanical vapor-compression system based on refrigerant measurements, this energy must be accounted for. Based on data from compressor manufacturers, the microprocessor will be supplied with enough information so the user need only specify the type of compressor and size of the mechanical vapor-compression system for the heat loss term in equations (10) and (11) to be automatically calculated.

Since the motor efficiency relates the measured power input to the actual power delivered to the shaft driving the compressor, it is essential that the value input to the microprocessor be representative of the actual motor efficiency. Therefore, as was the case with the jacket heat loss, a survey of numerous compressor manufacturers can provide this data and have it stored in the microprocessor so that, upon selection of a particular mechanical vapor-compression system, the appropriate motor efficiency will be chosen for use in the coefficient of performance calculations.

Figure 4:
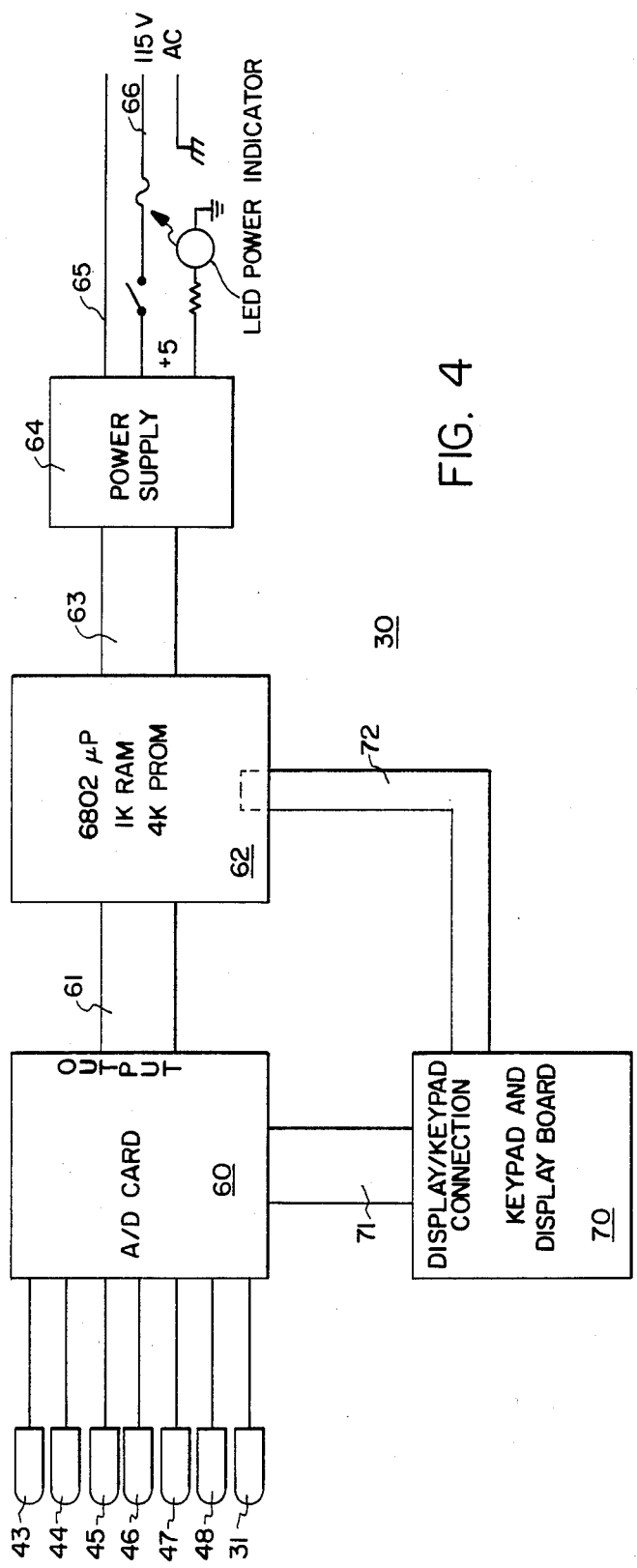
FIG. 4 is a block diagram of a microprocessor for use with the invention.

In FIG. 4 there is disclosed a microprocessor with connections for the coefficient of performance measuring device 30 using the refrigerant side analysis method that has been developed. The sensors 44 and 47 (on FIG. 1) that are connected to the inside coil 22 and the outside coil 16 are not required if the viscous pressure losses are negligible. The coefficient of performance meter 30 is shown in FIG. 4 wherein the sensors 43, 44, 45, 46, 47, 48, and 31 are disclosed as an input to an analog to digital card 60. This card is connected by a multi-pin ribbon cable 61 to a microprocessor that could be a Motorola 1A microprocessor known as a 6802 which has a 1K RAM and a 4K PROM memory for storage of information as indicated. The microprocessor 62 is connected by a multi-pin power cable 63 to a power supply 64 that is capable of supplying the microprocessor and electronics with the correct power. Power input to the power supply 64 is shown at conductors 65 and 66 and are of conventional design.

A keypad and display board 70 is provided for input and output of data from the coefficient of performance device 30 and is interconnected by a multi-pin ribbon 71 to the analog to digital card 60 and by multi-pin ribbon cable 72 to the input ports of the microprocessor 62. This microprocessor arrangement provides the specific coefficient of performance measuring device 30 with the ability to store the power loss characteristics of the motor in a power loss storage means, the pressure versus enthalpy characteristics of the mechanical vapor-compression system under test in a pressure-enthalpy storage means, the temperature versus entropy characteristics of the mechanical vapor-compression system under test in a temperature-entropy storage means, and further provides a processor means wherein a plurality of input means are connected to receive the signals from the storage means and from the various temperature sensing means and the power transducer means.

In order to further explain the operation of the present device, the coefficient of performance meter 30 executive flow chart is disclosed in FIG. 5. At block 80 the parameters are initialized and at 81 the registers are cleared. The output of 81 is fed to a check start initialization device at 82 which can provide a "no" indication at 83, or can continue on with the sequence at 84. If the sequence is continued at 84, the system checks the coefficient of performance with the meter 30 in the heating or cooling mode at 85. The appropriate mode is verified by the check of the coefficient of performance modes at 86 or 87 for heating and cooling. The modes are properly selected and the system flows on to 88 where the selection of the appropriate refrigerant data is checked. At 90 the sensors (that is the temperature sensors and the power transducer means) are read as is a real time clock. With this information the data flow is to 91 to perform the calculations based on the operational mode. At 92, if the instantaneous coefficient of performance is available, it can be displayed at 93 or further processed in a check cycle pattern 94 which then indicates a steady state and displays it at 95.

A representation of a specific coefficient of performance measuring device 30 has been disclosed in a generalized form with the development of theory of operation in a detailed mathematical presentation. This can be readily implemented in the microcomputer or microprocessor of FIG. 4 when considered with the flow chart of FIG. 5. Variations have been disclosed within the presentation showing how a system can be built in a simplified form if certain losses can be neglected. Various other structural and functional variations would be obvious to one skilled in the art, and the present applicants wish to be limited in the scope of their invention solely by the scope of the appended claims.

The embodiments of the invention in which an exclusive property or right is claimed are defined as follows:

1. A specific coefficient of performance measuring device for a mechanical vapor-compression system having a motor, a compressor driven by said motor, inside coil means, outside coil means, and fluid expansion means with said specific coefficient of performance measuring device including: power transducer means connected to said motor to measure the power supplied to said motor with said power transducer means having an electrical output indicative of the power drawn by said motor; a plurality of temperature sensing means connected to measure temperatures including the temperatures of an inlet and an outlet of said compressor, and an inlet and an outlet of said fluid expansion means with all of said measured temperatures being represented by electrical signals as outputs from said temperature sensing means; power loss storage means to store losses typical of said motor; pressure-enthalpy storage means to store the pressure versus enthalpy characteristics of the mechanical vapor-compression system under test; temperature-entropy storage means to store the temperature versus entropy characteristics of the mechanical vapor-compression system under test; processor means having a plurality of input means connected to receive signals from said power loss storage means, said pressure-enthalpy storage means, said temperature-entropy storage means, said power transducer means, and said plurality of temperature sensing means; and output means for said coefficient of performance device connected to said processor means to provide a specific coefficient of performance for said system by said processor means determining the power delivered by said motor and by said processor means continuously determining said coefficient of performance.

2. A specific coefficient of performance measuring device as claimed in claim 1 wherein said power loss storage means, said pressure-enthalpy storage means, said temperature-entropy storage means, and said processor means of said coefficient of performance device form a portable meter which is capable of being connected by said power transducer means to said motor, and by said temperature sensing means to said compressor inlet and outlet and said fluid expansion means inlet and outlet at a location which is proximately to said outside coil means and without the need to have access to said inside coil means.

3. A specific coefficient of performance measuring device as claimed in claim 2 wherein said processor means, said power loss storage means, said pressure-enthalpy storage means, and said temperature-entropy storage means form part of a microprocessor.

4. A specific coefficient of performance measuring device as claimed in claim 1 wherein said plurality of temperature sensing means are individual temperature responsive sensors that are attached external to said inlets and outlets of said compressor and to said inlet and outlet of said fluid expansion means.

5. A specific coefficient of performance measuring device as claimed in claim 4 wherein said processor means, said power loss storage means, said pressure-enthalpy storage means, and said temperature-entropy storage means form part of a microprocessor.

6. A specific coefficient of performance measuring device as claimed in claim 1 wherein said plurality of temperature sensing means further includes means to sense the temperature of said inside coil means and said outside coil means.

7. A specific coefficient of performance measuring device as claimed in claim 6 wherein said power loss storage means, said pressure-enthalpy storage means, said temperature-entropy storage means, and said processor means of said coefficient of performance device form a portable meter that is capable of being connected by said power transducer means to said motor, and by said temperature sensing means to said compressor inlet and outlet, said indoor and outdoor coil means, and to said fluid expansion means inlet and outlet external to said mechanical vapor-compression system.

8. A specific coefficient of performance measuring device as claimed in claim 7 wherein said plurality of temperature sensing means are individual temperature responsive sensors that are attached external to said inlets and outlets of said compressor, external to said inside and outside coil means, and external to said inlet and outlet of said fluid expansion means.

9. A specific coefficient of performance measuring device for a mechanical vapor-compression system having a motor, a compressor driven by said motor, inside coil means, outside coil means, and fluid expansion means with said specific coefficient of performance measuring device including: power transducer means connected to said motor to measure the power supplied to said motor with said power transducer means having an electrical output indicative of the power drawn by said motor; a plurality of temperature sensing means connected to measure temperatures including the temperatures of an inlet and an outlet of said compressor, and an inlet and an outlet of said fluid expansion means with all of said measured temperatures being represented by electrical signals as outputs from said temperature sensing means; and processor means including output means and having a plurality of input means connected to receive signals from said power transducer means, and said processor means further connected to receive signals from said plurality of temperature sensing means to provide a specific coefficient of performance for said system by said processor means determining the power delivered by said motor and by said processor means continuously determining said coefficient of performance.

* * * * *